United States Patent [19]
Russell et al.

[11] 3,734,417
[45] May 22, 1973

[54] ELECTRIC PEPPER MILL

[75] Inventors: John Duncan Russell, Malibu; Neil E. Carter, Santa Ynez, both of Calif.

[73] Assignees: John Duncan Russell; Neil E. Carter, Los Angeles, Calif. ; part interest to each

[22] Filed: July 20, 1971

[21] Appl. No.: 164,339

[52] U.S. Cl. ................................................. 241/168
[51] Int. Cl. .............................................. A47j 42/06
[58] Field of Search ........................ 241/168, 257 R; 30/DIG. 7; 200/157, 182, 183, 184, 185, 220, 225; 219/233, 240

[56] References Cited

UNITED STATES PATENTS

| | | | |
|---|---|---|---|
| 3,461,874 | 8/1969 | Martinez | 219/233 X |
| 3,281,636 | 10/1966 | Fleckenstein et al. | 30/DIG. 1 |
| 1,327,385 | 1/1920 | Hammer | 241/168 |
| 3,268,786 | 8/1966 | Reich | 30/DIG. 1 |
| 3,518,711 | 7/1970 | Radcliffe | 219/240 X |

FOREIGN PATENTS OR APPLICATIONS

| | | | |
|---|---|---|---|
| 941,643 | 4/1956 | Germany | 241/168 |

*Primary Examiner*—Granville Y. Custer, Jr.
*Attorney*—Pastoriza & Kelly

[57] ABSTRACT

An electric cordless pepper mill is provided in the form of an elongated body having a base incorporating batteries, a motor, and a gear reduction means for operating a rotor grinder disposed in the top portion of the body. A tilt switch is incorporated so that the motor is only operated when the body is tilted to position the top lower than the base, the ground pepper passing from the top of the body.

7 Claims, 3 Drawing Figures

Patented May 22, 1973

3,734,417

ELECTRIC PEPPER MILL

This invention relates generally to pepper mills and more particularly to a cordless electric pepper mill for use in the home or restaurants for providing pepper.

BACKGROUND OF THE INVENTION

All conventional pepper mills are hand operated. Usually these devices include a body incorporating peppercorns in their lower portions and are provided with a manually operable rotatable top which is twisted to pass pepper from the bottom portion of the grinder. Because a manual operation is required, the physical arrangement of having the ground pepper pass from the bottom of the body is most convenient for a user. On the other hand, loose grounds of pepper often cling to the bottom portion of the grinder and are shaken loose when the grinder is placed on a table thereby soiling the table. Also, as a consequence of the configuration of manually operated pepper grinders adjustment between course and fine grinding is accomplished at the bottom of the body and is somewhat awkward and inconvenient. There is also encountered some difficulty in filling conventional pepper mills with peppercorns primarily because the fill opening is too small and generally requires some disassembly of the pepper mill itself.

BRIEF DESCRIPTION OF THE PRESENT INVENTION

The present invention has as its primary objects to overcome various of the foregoing problems associated with conventional type hand operated pepper mills.

More particularly, in accord with the present invention, there is provided an elongated hollow body terminating at its lower end in a base and at its upper end in a neck opening having first coupling means. A motor means includes a battery receiving means, a motor, and gear reduction means incorporated in the base. An elongated rotor connected to the gear reduction means extends upwardly within the body towards the neck opening, the rotor terminating in a grinding end portion. A top defining an outlet opening and having second coupling means for coupling engagement with the first coupling means on the neck opening serves to hold a stator body. This stator body has a tapered internal grinding surface receiving the grinding end portion of the rotor. With this arrangement, the degree of coupling of the top determines the annulus defined between the stator and rotor as a consequence of the tapering of the internal grinding surface of the stator so that adjustments can very easily be made between course and find grinding. Further, filling of the pepper mill body is very easily accomplished by simply uncoupling the top which because it removes the grinding stator leaves a fairly large opening for receiving peppercorns.

Preferably a tilt switch is incorporated in the elongated body which is responsive to tilting of the body to a position in which the top is lower than the base. Also, the invention contemplates in certain embodiments a charging unit provided with a cavity for receiving the base of the body and including contacts for charging batteries in the base portion when the pepper mill is not in use.

BRIEF DESCRIPTION OF THE DRAWINGS

A better understanding of the invention will be had by referring to the accompanying drawings in which.

DETAILED DESCRIPTION OF THE PREFERRED EMBODIMENT

Figure 1:
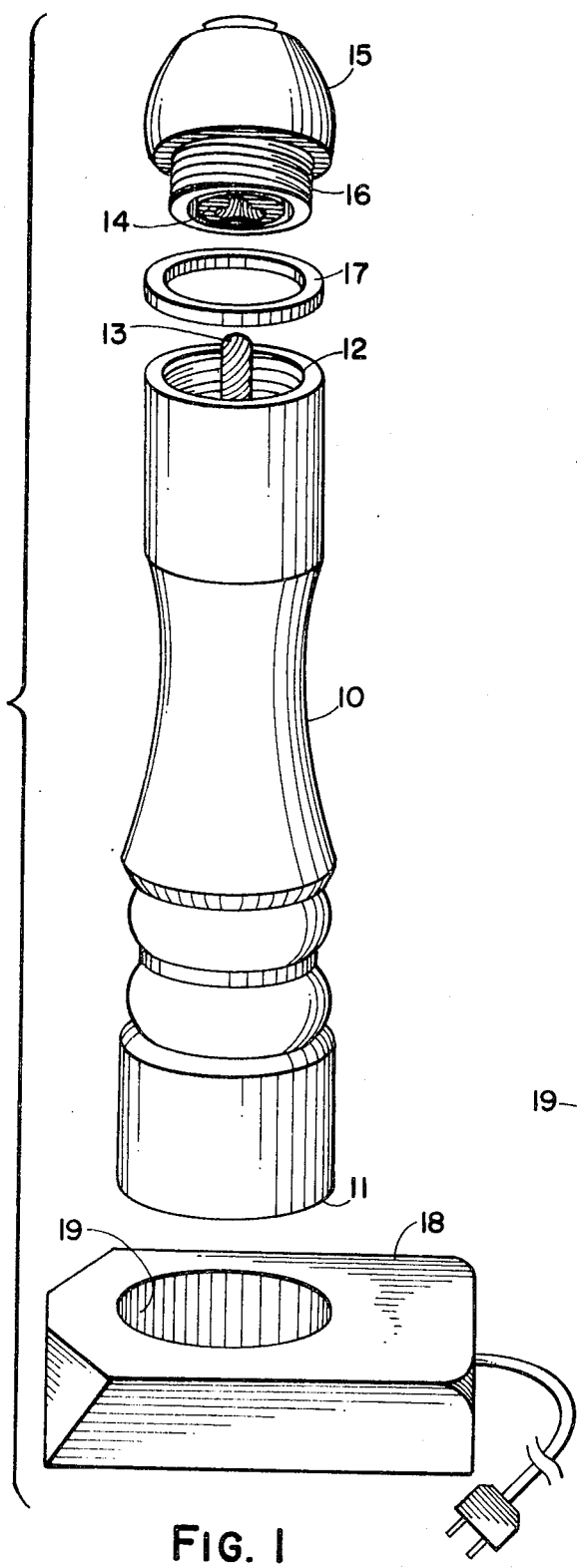
FIG. 1 is an exploded perspective view showing the basic components making up the electric pepper mill of this invention.

Referring first to FIG. 1, the electric pepper mill includes an elongated hollow body 10 terminating at its lower end in a base 11 and at its upper end in an internally threaded neck opening 12. An upper end grinding surface portion of an elongated rotor 13 is shown adjacent to the neck opening 12.

This grinding surface portion of the rotor 13 cooperates with a stator body 14 held within a top 15 having external threads 16 for mating engagement with the internal threads 12. The extreme upper end portion of the top 15 includes an outlet opening as will become clearer as the description proceeds.

In the view of FIG. 1 there is shown a washer 17 dimensioned to fit between the top 15 and the periphery of the threaded neck opening 12. The purpose for this washer will also become clearer as the description proceeds.

Shown below the base 11 is a charging unit 18 having a cavity 19 dimensioned to receive the base 11.

Figure 2:
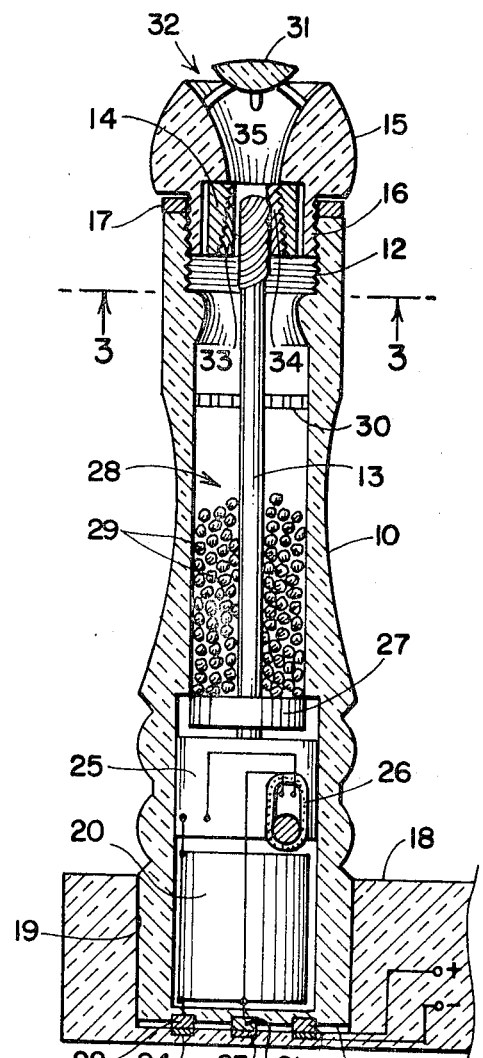
FIG. 2 is an assembled view partly in cross-section of the pepper mill of FIG. 1.

Referring now to FIG. 2, the base 11 of the body 10 is shown received within the cavity 19 of the charging unit 18. Within the base portion 11 there is illustrated by the solid block 20 batteries. These batteries connect through contacts in the form of a center contact 21 and ring contact 22 in the base 11 which contacts in turn co-operate with a center contact 23 and ring contact 24 in the bottom of the cavity 19 of the charging unit 18. Also included in the base is a motor 25, a gravity actuated switch 26 for connecting the batteries 20 to the motor 25 in response to tilting of the body 10, and a gear reduction means 27 coupling the motor 25 to the grinding rotor 13.

It will be noted that the main portion of the elongated body 10 defines an internal chamber 28 for holding peppercorns 29. A centering plate 30 suitably perforated with large openings serves to stabilize the rotor 13 which extends upwardly to the vicinity of the neck opening 12 as described in FIG. 1.

Referring to the top 15 as shown in FIG. 2, it will be noted that there is provided a deflecting disc 31 defining an annular outlet opening 32. Below the opening in the top is shown the stator 14 and it will be noted that the internal grinding surface of the stator includes lobes one of which is shown at 33. Between the lobes, the surfaces are tapered such as shown at 34. The lobes and tapered portions co-operate with the grinding portion of the rotor 13. This grinding portion may be in the form of helical splines 35.

Figure 3:
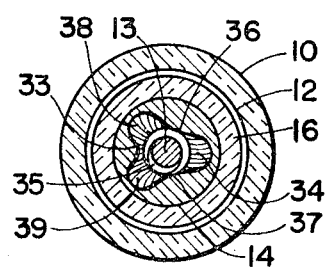
FIG. 3 is a cross-section taken in the direction of the arrows 3—3 of FIG. 2.

With particular reference to FIG. 3, the foregoing geometry can be better understood. Thus there are shown additional lobes 36 and 37 with tapered grinding surface portions 38 and 39 to define a three lobe opening. The taper is from the entrance opening for the rotor towards the upper outlet opening so that the cross-sectional area of the entrance opening is greater than the cross-sectional area of the outlet opening in the stator. The cross-sectional area of the grinding end portion of the rotor 13 is less than and dimensioned such that the stator can telescope over the end of the rotor so that when the top 15 is removed it carries the stator body 14 with it. On the other hand, it will be evident that the annular outlet defined between the grinding end portion of the rotor and the internal grinding surface of the stator will vary depending upon how far down the top 15 is threaded into the neck opening 12. Thus course and fine grinding can be adjusted by the degree of threading of the top.

The washer element 17 described in FIG. 1 is shown in FIG. 2 between the top 15 and periphery of the neck opening 12. With the washer in place, the threading of the top 15 is limited and serves to position the stator relative to the rotor such that course grinding results. For fine grinding, the washer would be removed and the top 15 threaded completely into the neck opening 12 thereby positioning the rotor grinding portion further into the stator and decreasing the annular space defined between the rotor and stator to provide finely ground pepper.

OPERATION

The operation of the electric pepper mill will be readily understood from the foregoing description. With reference to FIG. 1, it will be noted that filling of the pepper mill is extremely simple, it only being necessary to unthread the top 15 and pour peppercorns into the open neck 12. Because of the internal threading arrangement, the open area is relatively large and it is very simple to fill the body 10. If finely ground pepper is preferred, the washer 17 is removed and the top 15 simply threaded down into the neck threads 12. If course pepper is desired, the washer 17 is positioned between the top and neck as described heretofore.

The pepper mill 10 may then be placed on a restaurant table or a home dining room table in an upright position. When anyone desires to use the pepper mill, the person will simply conveniently tilt the mill over his salad or other food and this tilting action will cause the gravity switch 26 described in FIG. 2 to bridge a circuit from the batteries 20 to the motor 25. This action will occur when the top of the pepper mill is in a position lower than the base. The gravity switch 26 may include a conducting ball, mercury, or any other type of gravity sensitive circuit closing structure. Turning the pepper mill upright will disconnect the batteries from the motor 25 and thus stop the grinding action. Any loose particles of pepper will fall back into the top 15 because of the normal upright position for the pepper mill.

When the pepper mill is not to be used or is stored, it is preferably placed in the battery charger unit 18 shown in both FIGS. 1 and 2. This unit not only serves to recharge the batteries by direct electrical engagement of the various contacts described in FIG. 2 when the base 11 is received in the cavity 19, but also serves as a convenient support for the pepper mill.

The particular configuration of the grinding end of the rotor and the tapered interior grinding surface and lobe structure of the stater enables rapid grinding of the peppercorns without the high torque heretofore required in some conventional hand operated type pepper mills. As a result, there is not required a large gear reduction nor a particularly powerful motor. Of course, the less the gear reduction the faster will the rotor 13 rotate. In a particular embodiment constructed, the gear reduction was 25 to 1 which resulted in fairly rapid rotation of the rotor 13 and a plentiful supply of ground pepper.

Details of the charging unit 18 have not been described. This unit will normally plug into a conventional 110 volt residential outlet and includes the usual rectifier arrangement for charging the batteries (not shown).

It should be understood that the threaded connection between the top and neck opening could be altered to a different type of coupling means such as a bayonet type coupling with axially spaced projections or slots to control the degree of coupling. The threads as shown could be reversed by externally threading the neck and internally threading the top.

Also, the taper in the stator could be reversed so that unthreading of the top results in a finer grind rather than a courser grind.

All such alternatives are clearly within the scope and spirit of the present invention.

From the foregoing description, it will be evident that the present invention has provided a greatly improved pepper mill grinder not only more convenient to use but in which loading and adjusting are greatly facilitated as a consequence of the provision of a cordless electric drive.

What is claimed is:

1. An electric pepper mill comprising, in combination:
   a. a hollow body having a top outlet opening for ground pepper;
   b. motor means in said body below said top outlet opening;
   c. a rotor coupled for rotation by said motor means extending upwardly towards said top outlet opening, said rotor terminating in a grinding end portion;
   d. a stater in said top opening receiving the grinding end portion of said rotor; and,
   e. a tilt switch responsive to tilting of said body to a position in which its top is lower than its base to start said motor means whereby said hollow body may be filled with peppercorns and upon tilting of said body and operation of said motor, said peppercorns are gradually fed to and ground up by said stater and rotor.

2. An electric pepper mill according to claim 1, in which said motor means includes energizing batteries, a motor, and gear reduction means coupling said motor to said rotor whereby a cordless electric pepper mill is provided.

3. An electric pepper mill comprising, in combination:
   a. an elongated hollow body terminating at its lower end in a base and at its upper end in a neck opening having first coupling means;
   b. a motor and gear reduction means in said base;
   c. an elongated rotor connected to said gear reduction means and extending upwardly towards said neck opening, said rotor terminating in a grinding end portion;

d. a top defining an outlet opening and having second coupling means for coupling engagement with said first coupling means on said neck opening; and e. a stator body held in said top and having a tapered internal grinding surface receiving said grinding end portion of said rotor, the degree of coupling of said top determining the annulus defined between the stator and rotor as a consequence of the tapering of the internal grinding surface of said stator whereby said hollow body may be filled with peppercorns and upon tilting of said body and operation of said motor, said peppercorns are gravity fed to and ground up by said stator and rotor, the fineness of the ground pepper being determined by the degree of coupling of said top.

4. An electric pepper mill according to claim 3, including battery receiving means in said base and a gravity actuated switch in said base responsive to tilting of said body to a position in which said top is lower than said base for connecting said motor to batteries when received in said battery receiving means whereby a cordless electric pepper mill is provided.

5. An electric pepper mill according to claim 4, including, in combination, a battery charging unit having a cavity dimensioned to receive the base of said body when in an upright position and to support the body; and electrical contacts in said base and bottom of said cavity automatically placed into electrical engagement when said base is received in said cavity whereby charging of batteries received in said battery receiving means can take place when said pepper mill is not in use.

6. An electric pepper mill according to claim 3, including a spacing washer positionable between said top and the periphery of said neck opening whereby the degree of coupling of said top is limited to a given degree by said washer to provide ground pepper of a first degree of fineness and removal of said washer enables coupling of said top further into said neck opening to provide ground pepper of a second degree of fineness.

7. An electric pepper mill according to claim 3, in which said stator includes at least three internal lobes, the internal grinding surface portions between said lobes tapering to define a smaller cross-sectional area outlet opening from the inlet opening receiving the grinding end portion of said rotor, said grinding end portion of said rotor having a cross-sectional area less than that of the outlet on said stator so that said stator can telescope off from the end of said rotor when said top is removed to fill said body with peppercorns.

* * * * *